United States Patent [19]
Niederstadt et al.

[11] Patent Number: 6,119,826
[45] Date of Patent: Sep. 19, 2000

[54] DEVICE FOR OPERATING MACHINE ELEMENTS SUBJECT TO WEAR-RELATED PLAY

[75] Inventors: Jörg Niederstadt, Hemmingen/Devese; Ralf Stoffels, Schwienau; Erhard Lehnert, Uetze; Axel Kemner, Isernhagen, all of Germany

[73] Assignee: Mannesmann AG, Düsseldorf, Germany

[21] Appl. No.: 09/207,231

[22] Filed: Dec. 8, 1998

[30] Foreign Application Priority Data

Dec. 8, 1997 [DE] Germany ............................ 197 55 896

[51] Int. Cl.⁷ .................................................. F16D 65/52
[52] U.S. Cl. ........................................... 188/197; 188/203
[58] Field of Search ................................ 188/71.8, 196 R, 188/197, 198, 202, 203, 196 B, 196 BA

[56] References Cited

U.S. PATENT DOCUMENTS

| 4,088,205 | 5/1978 | Frania et al. | 188/196 D |
| 4,431,089 | 2/1984 | Nadas et al. | 188/196 D |
| 4,805,740 | 2/1989 | Wilke et al. | 188/173 |

FOREIGN PATENT DOCUMENTS

| 0 174 690 | 3/1986 | European Pat. Off. | B61H 15/00 |
| 1 269 426 | 3/1965 | Germany . | |
| 2 201 082 | 7/1972 | Germany | F16D 65/32 |
| 0121815 | 3/1984 | Germany | 188/203 |

*Primary Examiner*—Robert J. Oberleitner
*Assistant Examiner*—Pamela J. Lipka
*Attorney, Agent, or Firm*—Cohen, Pontani, Lieberman & Pavane

[57] ABSTRACT

A device for operating a machine element subject to wear-related play, especially for brakes of rail vehicles, includes a pressure-medium-operated piston-cylinder arrangement having a cylinder and operating piston, the piston rod of which is actively connected to a readjustment device that compensates for wear-related play. To realize a simple and compact structure and create further prerequisites for active integration into an operating system, the readjustment device comprises a readjustment piston mounted in the piston-cylinder arrangement between the operating piston and the bottom of the cylinder and acts as a limit stop for the operating piston. For axial arresting the readjustment piston, a coaxial piston rod shoulder that faces the bottom of the cylinder and a holding element resting on the bottom of the cylinder form an arresting arrangement that permits movement of the readjustment piston toward the operating piston and blocks a counter movement of the readjustment piston. A cylinder space created between the cylinder bottom and the readjustment piston is pressurized from an external source with a pressure medium via a pressure medium port to move the readjustment piston.

12 Claims, 1 Drawing Sheet

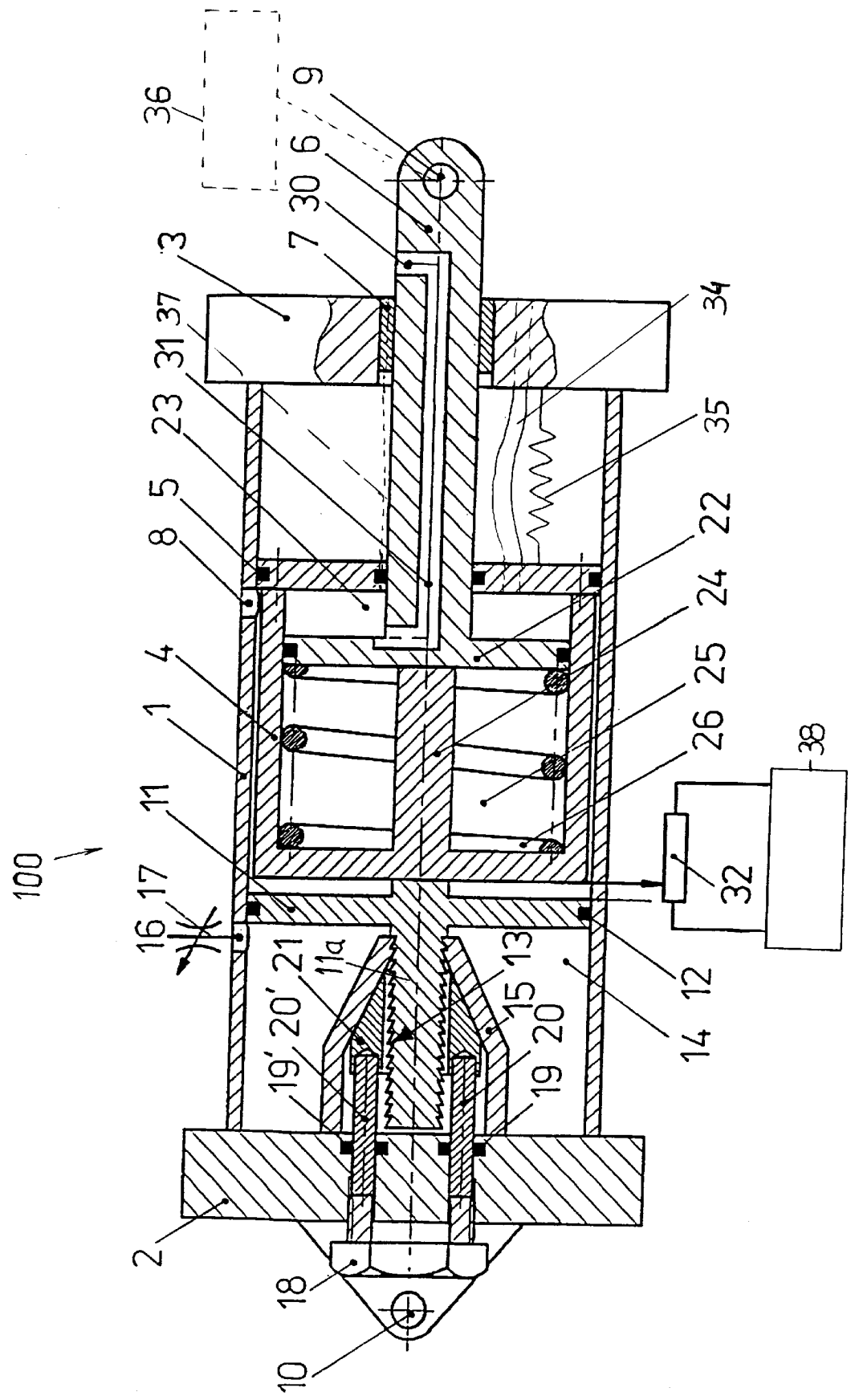

DEVICE FOR OPERATING MACHINE ELEMENTS SUBJECT TO WEAR-RELATED PLAY

BACKGROUND OF THE INVENTION

1. Field of the Invention

The invention relates to a device for operating machine elements subject to wear-related play, especially for brakes of rail vehicles.

2. Description of the Related Art

The machine elements subject to wear-related play according to the present invention are, for example, couplings or brakes. Such machine elements are used to transmit driving and braking forces in rail vehicles. To interrupt and close the power flow, linings that withstand high thermal stresses and that permit an advantageous power flow curve are used. These linings are subject to wear, which results in gradually increasing wear-related play. To compensate for this wear-related play, readjustment devices are known.

For example, EP 0 174 690 discloses a prior art readjustment device of the adjustment nut and screw type that compensates for wear-related play in brakes by rotating the adjustment nut on a piston screw to alter the position of the piston screw. This readjustment device includes a control sleeve that, under spring force and via a first coupling, prevents rotary movement of the adjustment nut, thereby preventing a longitudinal readjustment movement of the piston screw. After the brakes experience a predetermined amount of wear, a piston rod for activating the brakes moves beyond a certain distance, releasing the first coupling and allowing adjustment of the play distance in keeping with the wear that has occurred on the linings. Further forward movement by the piston rod results in the connection of a second coupling, so that further movement of the adjustment nut on the screw is stopped. This mechanism for connecting and disconnecting the adjustment nut is complicated to construct and assemble and therefore, is expensive to manufacture.

According to, for example, reference DE OS 22 01 082, another prior art readjustment device for rail vehicle brakes is used in connection with a piston-cylinder arrangement for brake activation and a brake gear for brake power transmission. This reference also indicates that the known operating devices comprise several individual components that must be connected, so that their assembly is expensive. Furthermore, the known operating devices are self-sufficient systems and therefore cannot be monitored by an overall operating system, such, for example, as a braking system for monitoring and operating all brakes on a rail vehicle, with respect to operating state and wear and cannot be controlled by such a system in a differentiated manner. Thus, the known operating devices do not meet the prerequisites for active integration into an overall braking system

SUMMARY OF THE INVENTION

It is an object of the present invention to provide a device for operating machine elements that are subject to wear-related play, especially for the brakes of rail vehicles, that is constructed simply and compactly and, furthermore, meets the prerequisites for active integration into an overall braking system.

A device for operating a machine element subject to wear-related play according to the present invention comprises a pressure-medium-operated piston-cylinder arrangement having a braking piston with a piston rod operatively connected to the machine element. The braking piston is actively connected to a readjustment device for compensating to wear-related play.

The readjustment device comprises a readjustment piston, which is integrated in the piston-cylinder arrangement on the piston-bottom side and is embodied as a limit stop for the braking piston. For the purpose of axial arresting, the readjustment piston has a coaxial piston rod shoulder that faces the bottom of the braking piston and forms, together with a holding element resting on the cylinder bottom, an arresting arrangement. The arresting arrangement permits movement of the readjustment piston toward the braking piston to compensate for wearrelated play and blocks the corresponding counter-movement. To move the readjustment piston toward the braking piston, a cylinder space located between the cylinder bottom and the readjustment piston is pressurized with a pressure medium via a port.

The readjustment device is thus directly integrated into the piston-cylinder arrangement and forms a compact unit therewith. The readjustment device according to the invention is characterized by a low number of parts and a simple structure. Because the readjustment piston and the brake piston are separately driven from an external source via a pressure medium, the operating device may be controlled in a differentiated manner by an overall braking system. This is a crucial prerequisite for integration of the operating device into, for example, an electronically-controlled braking system of a rail vehicle.

In another measure that improves integration of the operating device into an operating system, an electric distance measuring device which may, for example, comprise a slide resistor, determines the distance travelled by the braking piston and provides this information to the input of an electronic controller circuit for determining a readjustment action. When the distance travelled by the braking piston reaches a certain limit distance, the electronic controller circuit generates an output signal for the readjustment action. The operating device can thus be operated in bi-directional communication with the operating system, ensuring a high degree of automation overall. The electric distance measuring device may also measure the travel distance in a contact-free manner by using an inductive or capacitive distance measuring device.

For the purpose of arresting the readjustment device, a piston rod shoulder of the readjustment piston comprises barbed toothing that interlocks with complementary toothing on a holding element. This arresting mechanism for the readjustment device is characterized by a structure that is both simple and reliable. To reset the readjustment device, a hollow screw is screwed coaxially into the piston bottom and interacts with a section of the holding element embodied, at least internally, with a conical end. The hollow screw expands the holding element via a cone to disengage the interlock between the holding element and the readjustment piston, thereby permitting a resetting of the position of the readjustment piston. To allow such expansion, the holding element is equipped with at least two longitudinal slots.

Advantageously, the piston-cylinder arrangement has a cylinder space located between the readjustment piston and the brake piston. This space receives pressure via a pressure medium port for moving the brake piston. To reset the brake piston, a brake gear may be attached to the piston rod, or a reset spring may be arranged between the brake piston and the cylinder lid and integrated into the piston-cylinder arrangement.

In another embodiment of the invention, the operating device includes an integrated locking brake. In this case, the brake piston is hollow inside, like a cylinder, and comprises an integrated locking-brake piston mounted therein against a compression spring. The locking brake piston is connected with the piston rod. To reset and arrest the locking-brake piston, a pressure chamber is pressurized with a pressure medium via a port which acts counter to the compression spring. For pressurization with the pressure medium, the piston rod can be equipped with a pressure medium channel that starts in the area of the locking-brake piston, runs along the piston rod, and opens in a pressure medium port in the area of its free end. Alternatively, it is also conceivable, for the purpose of pressurization with a pressure medium, to use a flexible pressure medium hose that starts at a through boring in the locking-brake piston and opens in a through boring, embodied as a pressure medium port, in the cylinder lid. It is also possible, for the purpose of pressurizing the resetting pressure chamber of the locking brake with pressure medium, to use a rigid tube conduit that starts at a through boring to the pressure chamber in the operating brake piston, runs parallel to the piston rod, and emerges from the cylinder lid in a longitudinally movable fashion via an annular seal.

The embodiments of the invention described above relate, in particular, to use in a brake system, specifically, a brake system for rail vehicles. However, the solution according to the invention may also be used with a generic pressure-medium-operated operating devices that operate machine elements subject to wear-related play, e.g., couplings of every variety.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

The only FIGURE shows a longitudinal section through an operating device for operating brakes of rail vehicles according to an embodiment of the present invention.

DETAILED DESCRIPTION OF THE PRESENTLY PREFERRED EMBODIMENTS

Referring to the FIGURE, an operating device 100 according to the invention comprises a piston-cylinder arrangement with a cylinder 1, which is closed at its ends by a cylinder bottom 2 and a cylinder lid 3. A brake piston 4 is movably inserted in the cylinder 1. The brake piston 4 has an outer radial groove which receives an annular seal 5 for sealing the brake piston relative to the inside wall of the cylinder 1. A piston rod 6, which penetrates the cylinder lid 3 for the purpose of brake operation, projects coaxially from the brake piston 4. The piston rod 6 penetrates the cylinder 1 through an annular seal 7 in the cylinder lid 3. The annular seal 7 also guides the piston rod 6. A pressure medium port 8 is provided on the cylinder 1 for the operating pressure. When the brake piston 4 is pressurized to an operating pressure with a pressure medium via the pressure medium port 8 on the side facing away from the piston rod 6, the piston rod 6 moves outward to operate the brake of a rail vehicle. The position of the piston rod 6 may be reset by a spring 35 connected between the upper lid 3 of the cylinder 1 and the operating piston 4 when the pressure in the brake piston 4 is released. Optionally, a brake gear 36 schematically shown in dotted lines in the FIGURE, which produces a counterforce to the pressure is connected to the piston rod 6 of the piston-cylinder arrangement via a piston-rod-side attachment boring 9 may be used to reset the position of the piston rod 6. A cylinder-side attachment boring 10 is used for the stationary attachment of the piston-cylinder arrangement in a frame (not shown in the drawing) in the vicinity of the brake or brakes of a rail vehicle.

The piston-cylinder arrangement is also equipped with a readjustment device integrated in the area of the cylinder bottom 2. The readjustment device has a readjustment piston 11 forming a cylinder-bottom-side limit stop for the brake piston 4 and is sealed relative to the wall of the cylinder 1 by means of an annular seal 12 let into an outer radial groove in the readjustment piston 11. A piston rod shoulder 11*a* projects axially from the readjustment piston 11 toward the cylinder bottom 2. The piston rod shoulder 11*a* includes a barb-type toothing 13 on its radially outer surface, which engages a complementary toothing on the front of a sleevetype holding element 15. The sleeve-type holding element 15, at the end opposite to the toothing 13, is fixed to the cylinder bottom 2. The barb-type toothing 13 permits the readjustment piston 11 to move toward the braking piston 4 for the purpose of compensating for wear-related play. A counter-movement is blocked by the locking mechanism created by the barbed toothing 13, and the readjustment piston 11 can thus perform its readjustment and stop functions. As a result, consistently low pressure-medium consumption is ensured for operation of the brake piston 4, and the excursion times of the piston rod 6 can be kept virtually constant, resulting in advantageously constant operating times of the post-connected brake.

The readjustment movement of the readjustment piston 11 occurs via a cylinder space 14, which is located between the cylinder bottom 2 and the cylinder piston 11 and is pressurizable to a readjustment pressure with a pressure medium via a pressure medium port 16 on the cylinder 1. To allow pressurization to occur in a controlled fashion, the pressure medium port 16 comprises an adjustable throttle 17. Such controlled pressurization may not be required if the readjustment device encompasses a locking catch that allows to the readjustment device only one tooth step each time the cylinder space 14 is pressurized.

When worn brake linings are changed, the readjustment piston 11 must be reset to the starting position near the cylinder bottom 2 shown in the drawing. A hollow screw 18 screwed coaxially into the cylinder bottom 2 is used for the purpose of resetting. The hollow screw 18, when screwed in, presses against several ring-shaped cylinder pins 20, 20', which are let into the cylinder bottom 2 and are sealed relative thereto by seals 19, 19'. As a result, the cylinder pins 20, 20' press against a ring-like cone 21. The cone 21 expands the holding element 15 in the toothing area, so that the arresting of the readjustment piston 11 is released, whereupon the readjustment piston 11 is resettable to its starting position via the piston rod 6. The expandability of the holding element 15 is ensured by several longitudinal slots arranged in its toothing area and not shown in the drawing.

The piston-cylinder arrangement also has an integrated locking brake operation. For this purpose, the brake piston 4 is hollow inside forming an inner cylinder, and contains an axially movable locking-brake piston 22. The piston rod 6 is connected coaxially onto an end of the locking-brake piston 22 and penetrates the braking piston 4 coaxially. The penetration point in the braking piston 4 is sealed. The locking-brake piston 22 rests on a journal-like stop 24 within the brake piston 4 which projects toward the upper lid 3. In the hollow cylindrical spring space 25 created between the length of the stop 24 and an inner diameter of the hollow cylinder-like braking piston 4, a compression spring 26 is compressedly disposed. The compression spring 26 urges the locking-brake piston 22 toward the upper lid 3 end of the piston cylinder arrangement. The effect of the compression spring 26 is nullified by pressurization of a pressure chamber 23, which is arranged on a side of the locking-brake piston 22 opposing the compression spring 26, to an arresting pressure. The pressure chamber 23 is pressurized and ventilated via a pressure medium channel 31 that runs along the piston rod 6 and opens in a pressure medium port 30 located outside the cylinder 1. This arrangement performs a safety function by moving the piston rod 6 outward under the urgency of the compression spring 26 via the locking-brake piston 22 for operating the brake when system pressure in the the pressure chamber 23 drop below a preset operating value.

In an optional embodiment, a rigid tube 37 which runs along the operating piston rod 6 between the upper lid 3 of the cylinder 1 and the operating piston 4 may be used for pressurizing the pressure chamber 23 instead of pressure channel 31. In a further embodiment, a flexible tube 34 connected between the operating piston 4 and the upper lid 3 of the cylinder 1 may be used for pressurizing the pressure chamber 23 instead of pressure channel 31.

The piston-cylinder arrangement according to the invention may also comprise a distance measuring device 32 that determines the operating distance of the brake piston 4. The electric distance signal emitted by the distance measuring device 32 which may, for example, comprise a slide resistor, and is connected to the piston rod 6, is supplied to an electronic controller 38. The electronic controller 38 compares the current distance travelled by the brake piston with a predetermined limit distance. When this limit distance is reached due to advanced wear on the brake linings, a signal for readjustment action is given. A readjustment movement of the cylinder-bottom-side readjustment piston 11, which serves as the limit stop for the brake piston 4, is caused by the pressurization of the cylinder space 14 with a pressure medium. The readjustment distance travelled is thereby monitored via the distance measuring device 32, and the pressurization of the cylinder 14 with pressure medium is stopped as soon as a co-movement of the brake piston 4 is registered.

The operating device with an integrated readjustment device for machine elements subject to wear-related play (e.g., brakes and couplings) according to the invention is distinguished by a compact and comparatively simple structure and meets the constructive prerequisites for integration into an automatic total system.

The invention is not limited by the embodiments described above which are presented as examples only but can be modified in various ways within the scope of protection defined by the appended patent claims.

We claim:

1. A device for operating a machine element subject to wear-related play, comprising:
   a piston-cylinder arrangement having a cylinder and an operating piston axially movably mounted in said cylinder, wherein said cylinder has a bottom end and an upper end and said operating piston comprises an operating piston rod operatively connectable with the machine element;
   a readjustment device comprising a readjustment piston mounted in said cylinder between said bottom end of said cylinder and said operating piston and a first space is formed between said readjustment piston and said bottom end of said cylinder;
   a coaxial piston rod shoulder projecting axially from said readjustment piston toward said bottom end of said cylinder;
   a holding element connected on said bottom end of said cylinder forming an arresting arrangement with said coaxial piston rod shoulder permitting movement of said readjustment piston toward said operating piston and blocking a countermovement of said readjustment piston toward said bottom end such that said readjustment piston forms a limit stop for movement of said operating piston toward said bottom end; and
   said first space between said readjustment piston and said bottom end of said cylinder being pressurizable to a readjustment pressure via a pressure medium port in said cylinder for moving said readjustment piston toward said operating piston.

2. The device of claim 1, further comprising a distance measuring device and a control circuit, said distance measuring device being mounted relative to said cylinder for detecting a distance travelled by said operating piston and transmitting an output to said control circuit in response to said distance traveled, and said control circuit generating a readjustment signal when said output of said distance measuring device exceeds a predetermined limit distance.

3. The device of claim 2, wherein said distance measuring device comprises a slide resistor and is operatively connected to said operating piston.

4. The device of claim 1, wherein said holding element comprises a sleeve-type element, said piston rod shoulder of said readjustment piston comprises a barb-type toothing, and said arresting arrangement comprises a complementary barb-type toothing on an inner surface of said sleeve-type element interconnected with the barb-type toothing on said piston rod shoulder.

5. The device of claim 1, further comprising a hollow screw threaded through said bottom end of said cylinder; and
   an at least internally conically embodied section of said holding element with a slot for ensuring its expandability, wherein said hollow screw interacts with said at least internally conically embodied section for expanding said at least internally conically embodied section to an expanded position for permitting a resetting of said piston rod shoulder toward said bottom end of said cylinder.

6. The device of claim 1, wherein a second space between said readjustment piston and said operating piston is pressurizable to an operating pressure via a second port in said cylinder for operating the machine element.

7. The device of claim 6, further comprising one of a reset spring arranged between said top end of said cylinder and said operating piston and a brake gear operatively connected to said operating piston rod for returning said operating piston to a rest position against said readjustment piston when a pressure in said second space is released.

8. The device of claim 1, further comprising a locking operation piston and wherein said operating piston comprises a hollow element forming a second cylinder for axially movably receiving said locking operation piston; and
   a compression spring operatively compressedly inserted in said second cylinder for urging said locking operation piston toward said upper end of said piston-cylinder arrangement, wherein the locking operation piston is connected to said operating piston rod.

9. The device of claim 8, further comprising a pressure chamber in said second cylinder pressurizable to an arresting pressure via a pressure medium port for arresting said locking operation piston counter to an urgency of said compression spring.

10. The device of claim 9, further comprising an integrated pressure medium channel having a first end communicating with the pressure chamber in the second cylinder and a second end opening in the pressure medium port for pressurizing the pressure chamber in the second cylinder against the urgency of said compression spring.

11. The device of claim 9, further comprising a flexible pressure medium hose having a first end communicating with the pressure chamber in the second cylinder through said operating piston and a second end opening in the pressure medium port located on said top end of said cylinder for pressurizing the pressure chamber in the second cylinder against the urgency of said compression spring.

12. The device of claim 9, further comprising a rigid tube conduit running parallel to the operating piston rod and having a first end communicating with the pressure chamber in the second cylinder and a second end running through said top end of said cylinder in an annular seal and opening in the pressure medium port for pressurizing the pressure chamber in the second cylinder against the urgency of said compression spring.

* * * * *